(12) United States Patent
Bhatti et al.

(10) Patent No.: US 7,535,855 B2
(45) Date of Patent: *May 19, 2009

(54) STRUCTURED ADDRESSING SCHEME FOR WIRELESS NETWORKS

(75) Inventors: Ghulam Bhatti, Plainville, MA (US); Gaofeng Yue, Atlanta, GA (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 633 days.

This patent is subject to a terminal disclaimer.

(21) Appl. No.: 11/199,625

(22) Filed: Aug. 9, 2005

(65) Prior Publication Data

US 2007/0060134 A1 Mar. 15, 2007

(51) Int. Cl.
*H04L 12/28* (2006.01)
*H04W 40/00* (2009.01)

(52) U.S. Cl. ...................... 370/254; 455/445

(58) Field of Classification Search ............... 370/389, 370/408, 403, 401, 392, 254, 338; 455/445
See application file for complete search history.

(56) References Cited

U.S. PATENT DOCUMENTS

| | | | | |
|---|---|---|---|---|
| 5,596,687 A | * | 1/1997 | Peters, Jr. .................. | 345/582 |
| 2003/0037167 A1 | * | 2/2003 | Garcia-Luna-Aceves et al. .......................... | 709/238 |
| 2005/0237970 A1 | * | 10/2005 | Inoue ....................... | 370/328 |

OTHER PUBLICATIONS

Jobin et al.: "A scheme for the assignment of unique address to support self-organization in wireless sensor network," 2004.
Mcauley et al. "Self-configuring networks," Oct. 22, 2000.
S. Nesargi, R. Prakash. "MANETconf: Configuration of Hosts in a Mobile Ad Hoc Network," Proceedings of IEEE Infocom, Jun. 2002.
G. Ricart and A.K. Agrawala, "An optimal algorithm for mutual exclusion in computer networks," Comm. ACM, 24(1), pp. 9-17, 1981.
M. Mohsin and R. Prakash, "IP Address Assignment in a Mobile Ad Hoc Network," IEEE Military Communications Conference (MILCOM 2002), vol. 2, pp. 856-861, Oct. 2002.
Charles E. Perkins, J. T. Malinen, R. Wakikawa, E. M. Belding-Royer, and Y. Sun. "IP Address Autoconfiguration for Ad Hoc Networks," IETF Internet Draft, draft-ietf-manet-autoconf-01.txt, Nov. 2001.

* cited by examiner

*Primary Examiner*—Dang T Ton
*Assistant Examiner*—Frederick Ott
(74) *Attorney, Agent, or Firm*—Dirk Brinkman; Gene Vinokur

(57) ABSTRACT

A method assigns addresses to nodes in a wireless network. An address space is defined as an n-dimensional grid. Each grid intersection has coordinates of a corresponding possible node of a wireless network. A number of components of each coordinate is equal to a dimensionality of the grid, and the coordinates form a logical address of the corresponding node. A parent node assigns an unallocated logical address as a child node address to a child node joining the wireless network such that one component of the child node address is one larger than a corresponding component of the parent node.

6 Claims, 2 Drawing Sheets

STRUCTURED ADDRESSING SCHEME FOR WIRELESS NETWORKS

FIELD OF THE INVENTION

This invention relates generally to networks, and more particularly to assigning addresses to nodes in wireless networks.

BACKGROUND OF THE INVENTION

The latest advances in wireless networks have enabled applications such as home and industrial automation, environment monitoring and sensing, security and surveillance, human and goods tracking, and medical monitoring.

In a wireless network, each node can communicate with other nodes that are in transmission range. Each node has a unique identity to facilitate communication among the nodes. Address assignment in an ad hoc network is a problem due to the irregular and spontaneous nature of the network topology.

Some addressing schemes, such as the one used by the ZigBee Alliance, use a hierarchical tree of addresses. For example, a ZigBee coordinator (ZC) node initially has control over all allocated addresses. Subsequently, a parent node, beginning with the ZC node, allocates a portion of its address space to a child node when the child node joins network. Because the number of child nodes for any parent node is fixed as a configuration parameter, it is possible to systematically determine the portions of the address space that is allocated to a joining child node. That facilitates route discovery without explicit route discovery via broadcast messages.

However, the static structure of the ZigBee scheme can waste addresses, or even deny some parent nodes from assigning addresses to potential child nodes. In addition, there is a restriction on the maximum number of levels that the addressing tree can have in the network. Furthermore, a failure of a single node can make nodes with addresses lower in the tree inaccessible. This is a serious problem when the failed node is near the root of the tree.

Another addressing scheme uses a distributed dynamic address assignment protocol, S. Nesargi and R. Prakash, "MANETconf: Configuration of Hosts in a Mobile Ad Hoc Network," Proceedings of IEEE Infocom, June 2002. The protocol is based on a mutual exclusion process based on the Ricart-Agrawala algorithm, G. Ricart and A. K. Agrawala, "An optimal algorithm for mutual exclusion in computer networks," Comm. ACM, 24(1), pp. 9-17, 1981. A joining node selects a neighboring node as an initiator node. The initiator node selects an address and broadcasts a message to notify all other nodes in the network of the selected address. Then, the initiator node waits for responses from the other nodes in the network. If the responses from all of the nodes are positive, meaning no other node is using the selected address, then the initiator node assign this address to the joining node. Otherwise, the initiator node selects another address, and so forth.

However, there are several problems with that protocol. All nodes must maintain information about the allocated addresses. This requires memory, which is a limited resource in small sensor nodes. In addition, the broadcast messages and other management messages consume network resources such as bandwidth and power. Moreover, the initiator node can select any address. Therefore, the address assignment does not necessarily follow a regular or systematic pattern. This makes route discovery a problem.

Another addressing scheme uses a binary split algorithm, M. Mohsin and R. Prakash, "IP Address Assignment in a Mobile Ad Hoc Network," IEEE Military Communications Conference (MILCOM 2002), volume 2, pp. 856-861, October 2002. Each node maintains a block of available addresses. When a node wants to join the network, the joining node requests an address from a neighboring configuring node. The configuring node splits the block into two halves, and retains one half for itself and gives the other half to the requesting node. Every node maintains an address table to record the blocks of addresses. Each node also broadcasts periodically its block of addresses to enable other nodes to update their address tables. Addresses can also be 'borrowed' from other nodes. That scheme also leads to an address assignment that does not follow a regular or systematic pattern.

Another scheme performs duplicate address detection, C. E. Perkins, J. T. Malinen, R. Wakikawa, E. M. Belding-Royer, and Y. Sun, "IP Address Autoconfiguration for Ad Hoc Networks," IETF Internet Draft, draft-ietf-manet-autoconf-01.txt, November 2001. A joining node selects two random addresses for itself, each from a different group of available addresses. One address is used as a temporary source address for a verification process. The other address is intended for a final address assignment, pending the verification process. That scheme also requires a large number of broadcast messages, and addresses are generated randomly.

SUMMARY OF THE INVENTION

Provided is a method for assigning addresses to nodes in a wireless communications network. The method can be used for ad hoc networks, sensor networks, mesh networks, multi-hop networks, and other networks.

The method has a low overhead for memory and broadcast requirements. There are no restrictions on the maximum number of hops, or the number of parent-child node relationships. The method limits the waste of address space when the physical location of the nodes is not uniformly distributed.

DETAILED DESCRIPTION OF THE PREFERRED EMBODIMENTS

Figure 1:
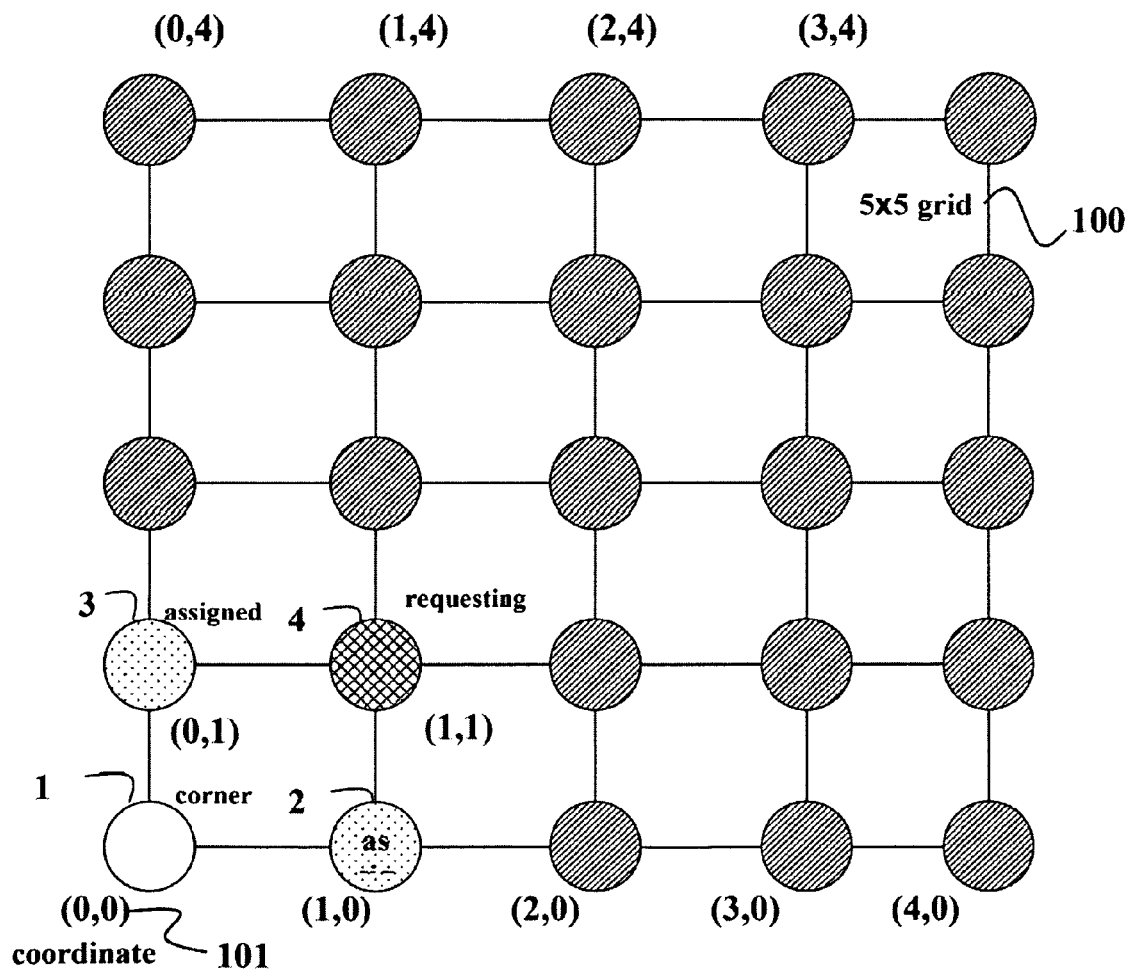
FIG. 1 is a grid of nodes and corresponding addresses in a Cartesian coordinate space according to an embodiment of the invention.

FIG. 1 shows an example n-dimensional grid 100 of nodes, where n is 2, in a wireless network according to an embodiment of our invention. Each intersection of the grid has Cartesian coordinates 101 e g., (0, 0), (0, 1), . . . (4, 4). The coordinates of the nodes or n-tuples are logical addresses of corresponding nodes. The coordinates have a number of components that is equal to the dimensionality of the grid. For example, in two dimensions, each logical address has two components.

A range of values for each component is expressed by the number of bits that are assigned to the component. For example, if a full address is specified by 16 bits, then each component can be assigned 8 bits for values in a range [0, 255]. Alternatively, the assignment can be 6 and 10 bits, and so forth. In other words, the grids can be a cube, rectangular or a higher order parallelepiped. Additional dimensions can also be used, e.g., in four dimensions the coordinates of the nodes are (k, l, m, n).

A 'corner' node 1 can be a coordinator node with a logical address (0, 0). Stippled nodes 2-3 have assigned addresses.

Cross-hatched node 4 is requesting an address. It should be noted that address assignment can start at any corner node.

If each address component is allocated 8 bits, then the four corner addresses are (0x0, 0x0), (0x0, 0xFF), (0xFF, 0x0), and (0xFF, 0xFF). We have selected (0x0, 0x0) as the starting address as a matter of convenience.

An unallocated logical address is assigned to a child node joining the network by having the child node first broadcast an address request message. In a ZigBee network, this can be a 'beacon request' message. All potential parent nodes within transmission range reply by sending a beacon frame to the requesting node. That frame contains an identification of the sender in addition to some extra information. The child node selects one of the replying potential parent nodes as the parent node. The selection can consider the compactness of the logical address space or the signal strength of the responding node.

The selected parent node then assigns a child node address to the joining child node as follows. The value of one component of the child node address is made one larger than the corresponding component of the parent node. For example, If the address of the parent node $N_1$ is (0, 0), then the address of the joining child node $N_2$ can be (0x1, 0x0) or (0x0, 0x1).

Other nodes that can possibly assign the same address at a later time are notified of the address assignment. For example, in FIG. 1, both nodes 2 and 3 can assign the same address to node 4. If node 2 assigns first, then node 3 is informed by node 2 that the address (1, 1) has been allocated to node 4.

In one embodiment of the invention, the assignment order can be according to a predetermined indexing scheme of the coordinate components. For example, the first component is incremented before the second component. Thus, the ordering can cause the addresses to be uniformly distributed.

Figure 2:
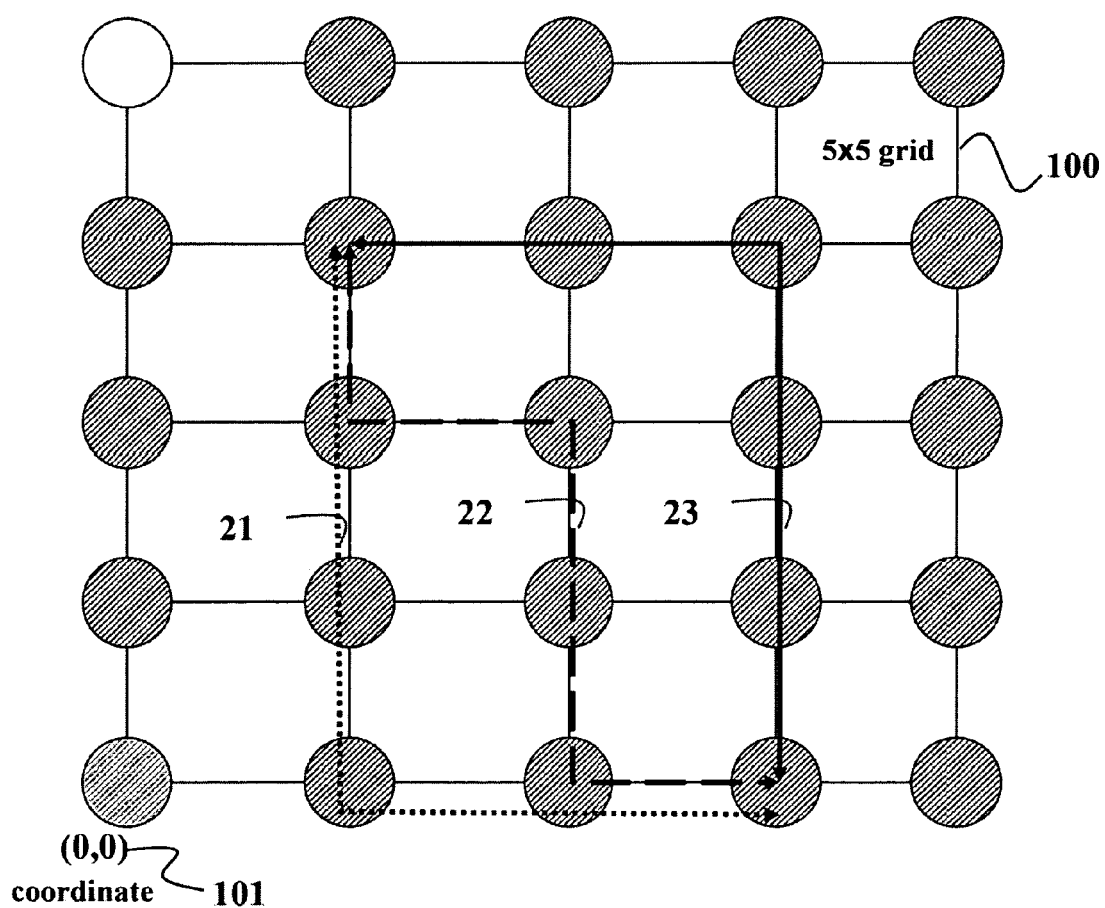
FIG. 2 is grid showing multiple routes.

It should be noted, that the selected addressing order also implies possible routing between any two nodes. In addition, unlike the tree-structured routing of ZigBee which only has one path to a particular node, our addressing scheme allows multiple paths 21-23, as shown in FIG. 2. Thus, the network, as a whole, is not affected by a failure of a single node. In fact, the network can continue to function even with multiple failed nodes, particularly if the number of dimensions of the grid is relatively high.

Although the invention has been described by way of examples of preferred embodiments, it is to be understood that various other adaptations and modifications may be made within the spirit and scope of the invention. Therefore, it is the object of the appended claims to cover all such variations and modifications as come within the true spirit and scope of the invention.

We claim:

1. A method for assigning addresses to nodes in a wireless network, comprising:
    defining an address space as an n-dimensional grid, each grid intersection having coordinates of a corresponding possible node of the wireless network, a number of components of each coordinate being equal to a dimensionality of the grid, and the coordinates forming a logical address of the corresponding possible node; and
    assigning, by a parent node to a child node joining the wireless network, an unallocated logical address as a child node address such that one component of the child node address is one larger than a corresponding component of the parent node.

2. The method of claim 1, which in a range of possible values of the one component is determined by a number of bits used to express the component.

3. The method of claim 1, in which the grid is in a form of a parallelepiped.

4. The method of claim 1, further comprising:
    assigning coordinates of a corner of the grid as the logical address of a coordinator node of the network.

5. The method of claim 1, further comprising:
    broadcasting, by the child node, an address request message;
    replying to the broadcast request message by one or more potential parent nodes; and
    selecting, in the child node, one of the potential parent nodes as the parent node.

6. The method of claim 1, in which the logical address defines a route between the nodes.

* * * * *